(12) United States Patent
Zhou et al.

(10) Patent No.: US 11,286,065 B2
(45) Date of Patent: Mar. 29, 2022

(54) METHOD FOR DESIGNING REENTRY TRAJECTORY BASED ON FLIGHT PATH ANGLE PLANNING

(71) Applicant: DALIAN UNIVERSITY OF TECHNOLOGY, Dalian (CN)

(72) Inventors: Wenya Zhou, Dalian (CN); Yutao Wang, Dalian (CN); Hongtu Ma, Dalian (CN); Hongbo Chen, Dalian (CN); Zhentao Nie, Dalian (CN); Yongyuan Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 290 days.

(21) Appl. No.: 16/629,725

(22) PCT Filed: Dec. 22, 2017

(86) PCT No.: PCT/CN2017/117968
§ 371 (c)(1),
(2) Date: Jan. 9, 2020

(87) PCT Pub. No.: WO2019/109407
PCT Pub. Date: Jun. 13, 2019

(65) Prior Publication Data
US 2021/0086921 A1  Mar. 25, 2021

(30) Foreign Application Priority Data
Dec. 7, 2017 (CN) .......................... 201711285057.0

(51) Int. Cl.
*B64G 1/62* (2006.01)
*B64G 1/24* (2006.01)

(52) U.S. Cl.
CPC ............... *B64G 1/62* (2013.01); *B64G 1/242* (2013.01); *B64G 1/244* (2019.05); *B64G 2001/245* (2013.01)

(58) Field of Classification Search
CPC .......... B64G 1/62; B64G 1/242; B64G 1/244; B64G 2001/245; G05D 1/101
See application file for complete search history.

(56) References Cited

U.S. PATENT DOCUMENTS 5,568,901 A * 10/1996 Stiennon ................ B64G 1/002
 244/171.3
6,119,985 A *  9/2000 Clapp .................... B64G 1/14
 244/171.4
(Continued)

FOREIGN PATENT DOCUMENTS

CN  104503471 A *  4/2015  ............... B64G 1/40
CN  104615144 A *  5/2015  ............... G21B 1/03
(Continued)

OTHER PUBLICATIONS

International Search Report and Written Opinion for Application No. PCT/CN2017/117968 dated Jul. 9, 2018, 8 pages.
(Continued)

*Primary Examiner* — Behrang Badii
*Assistant Examiner* — Jalal C Coduroglu
(74) *Attorney, Agent, or Firm* — Bayramoglu Law Offices LLC

(57) ABSTRACT

Disclosed is a method for designing a reentry trajectory based on flight path angle planning, including the following steps: S1. extracting an actual operating parameter of an aircraft, setting a maximum dynamic pressure $q_{max}$ a maximum stagnation point heat flux $\dot{Q}_{max}$, and a maximum overload $n_{max}$ according to a mission requirement, and solving for a velocity-height boundary of a reentry trajectory; S2. solving for a reentry trajectory in an initial descent stage according to differential equations of reentry motion, and setting up a flight-path-angle lower limit $\gamma_{min}(V)$ according to the reentry trajectory in the initial descent stage, the velocity-height boundary, and a target point in a velocity-height phase plane; and S3. planning, based on the flight-path-angle lower limit $\gamma_{min}(V)$, a flight path angle satisfying terminal constraints, and calculating a corresponding bank angle to obtain a reentry trajectory.

7 Claims, 2 Drawing Sheets

(56) References Cited

U.S. PATENT DOCUMENTS

| | | | | |
|---|---|---|---|---|
| 9,639,085 B1* | 5/2017 | Hellman | ................. | B64C 31/00 |
| 9,671,789 B1* | 6/2017 | Guo | ...................... | B64G 1/242 |
| 9,698,498 B1* | 7/2017 | Wang | ................... | H01R 4/2433 |
| 2015/0268048 A1* | 9/2015 | Seastrand | .............. | G01C 21/20 |
| | | | | 701/528 |
| 2016/0078769 A1* | 3/2016 | Coulmeau | ............ | G08G 5/0039 |
| | | | | 701/537 |
| 2016/0364988 A1* | 12/2016 | Deittert | ................ | G06Q 10/047 |

FOREIGN PATENT DOCUMENTS

| | | | | | |
|---|---|---|---|---|---|
| CN | 104615144 | A | | 5/2015 | |
| CN | 106227972 | A | * | 12/2016 | ............... B64G 1/40 |
| CN | 106354152 | A | * | 1/2017 | ............... B64G 1/40 |
| CN | 106643341 | A | * | 5/2017 | ............... B64G 1/40 |
| CN | 106647269 | A | * | 5/2017 | ............... G21B 1/03 |

OTHER PUBLICATIONS

Huang, G. et al., *A Survey of Numerical Algorithms for Trajectory Optimization of Flight Vehicles*, Science China Technologies Sciences, vol. 55, No. 9 (Sep. 2012) 2538-2560.
Zhou, W-Y. et al., *Rapid Planning of Reentry Trajectory With High Reliability*, Systems Engineering and Electronics, vol. 38, No. 8 (Aug. 2016)—1867-1872.
Written Opinion for Application No. PCT/CN2017/117968 dated Jul. 9, 2018, 6 pages.

* cited by examiner

METHOD FOR DESIGNING REENTRY TRAJECTORY BASED ON FLIGHT PATH ANGLE PLANNING

TECHNICAL FIELD

The present invention relates to the field of aviation and aerospace technologies, and specifically, to a method for designing a reentry trajectory based on flight path angle planning.

BACKGROUND

A lifting body reentry spacecraft has advantages of high speed, long range, strong maneuverability, etc., and can implement rapid global attack, material delivery, and other military missions. This type of aircraft has strong nonlinearity, strong coupling, fast dynamic change, and other dynamic characteristics during reentry flight. In addition, reentry flight needs to satisfy process constraints such as stagnation-point heat flux, dynamic pressure, and overload, as well as terminal constraints such as a velocity, a position, and a heading error angle. Therefore, the reentry trajectory design is extremely difficult.

A differential equation commonly used to describe reentry motion is as follows (earth's rotation is ignored):

$$\frac{dr}{dt} = V\sin\gamma \tag{1}$$

$$\frac{d\theta}{dt} = \frac{V\cos\gamma\cos\psi}{r\cos\phi} \tag{2}$$

$$\frac{d\phi}{dt} = \frac{V\cos\gamma\sin\psi}{r} \tag{3}$$

$$\frac{dV}{dt} = -\frac{D}{m} - g\sin\gamma \tag{4}$$

$$\frac{d\gamma}{dt} = \frac{1}{V}\left[\frac{L}{m}\cos\sigma - \left(g - \frac{V^2}{r}\right)\cos\gamma\right] \tag{5}$$

$$\frac{d\psi}{dt} = \frac{1}{V}\left[\frac{L}{m\cos\gamma}\sin\sigma - \frac{V^2}{r}\cos\gamma\cos\psi\tan\phi\right] \tag{6}$$

where r is a geocentric distance (a distance from the earth's center to a spacecraft); V is a flight velocity; $\theta$ and $\phi$ are respectively a longitude and latitude; $\gamma$ is a flight path angle; and $\psi$ is a heading angle. In addition, m is a mass of the aircraft. Expressions of drag force D and lift force L are as follows:

$$D = \tfrac{1}{2}\rho S C_D V^2 \tag{7}$$

$$L = \tfrac{1}{2}\rho S C_L V^2 \tag{8}$$

where $\rho$ represents atmospheric density; S represents a reference area of the aircraft; $C_L$ and $C_D$ respectively represent a lift coefficient and a drag coefficient (a relationship between a lift coefficient and an angle of attack $\alpha$ and velocity V and a relationship between a drag coefficient and the angle of attack $\alpha$ and velocity V are usually obtained according to the wind tunnel test).

In addition to the above six motion status variables, the equations further include two control variables, that is, the bank angle $\sigma$ and the angle of attack $\alpha$. The control action of the angle of attack $\alpha$ is implicit in the drag coefficient $C_D$ and the lift coefficient $C_L$.

An exponential model is used for the atmospheric density, and a specific expression of the atmospheric density is as follows:

$$\rho = \rho_0 e^{-h/\beta} \tag{9}$$

where $\rho_0$ is atmospheric density at sea level; h represents a height above sea level; and $\beta$ is the atmospheric constant.

A gravity model is as follows:

$$g = \frac{R_0^2}{r^2}g_0 \tag{10}$$

where $R_0$ is the earth radius, the height above sea level is $h = r - R_0$, and $g_0$ is a gravitational acceleration at sea level.

The design of a reentry trajectory shall consider process constraints and terminal constraints. The process constraints include stagnation-point heat flux, overload, and dynamic pressure, and are respectively as follows:

$$\dot{Q} = k_Q \rho^{0.5} V^{3.15} \leq \dot{Q}_{max} \tag{11}$$

$$n = \frac{\sqrt{L^2 + D^2}}{mg} \leq n_{max} \tag{12}$$

$$q = \frac{1}{2}\rho V^2 \leq q_{max} \tag{13}$$

A boundary of the three process constraints is an equation with respect to the geocentric distance r and the flight velocity V.

The terminal constraints include: the flight velocity V satisfies a terminal velocity requirement, and the geocentric distance, a range to go, and a heading error angle are within specific ranges:

$$V_f = V_{TAEM} \tag{14}$$

$$|r_f - r_{TAEM}| < \Delta r \tag{15}$$

$$|s_f - s_{TAEM}| < \Delta S \tag{16}$$

$$|\Delta\psi_f| < \Delta\psi_{TAEM} \tag{17}$$

In the formulas, a subscript f represents a reentry terminal status; and a subscript TAEM represents a required terminal status. s represents the range to go: by taking a plane determined by a point at which the aircraft is located, a target point, and the earth's center as an transient target plane, the range to go refers to a length of a great circle arc projected to the earth's surface from a current position to the target point in the transient target plane. A longitude and latitude, that is, $\theta_f$ and $\phi_f$, of the target point are known.

$$s = \cos^{-1}[\sin\phi_f \sin\phi + \cos\phi_f \cos\phi \cos(\theta_f - \theta)] \tag{18}$$

$\Delta\psi = \psi_{LOS} - \psi$ represents a heading error angle, and is an included angle between a line of sight (LOS) of the target point and current heading; $\psi_{LOS}$ represents a line-of-sight azimuth angle of the aircraft from a current position to the target point (due north is used as a reference, and clockwise is a positive direction); and an expression of $\psi_{LOS}$ is as follows:

$$\psi_{LOS} = \tan^{-1}\left[\frac{\sin(\theta_f - \theta)}{\cos\phi\tan\phi_f - \sin\phi\cos(\theta_f - \theta)}\right] \tag{19}$$

The design of a reentry trajectory means designing the two control variables, that is, the angle of attack α and the bank angle σ, to allow a motion trajectory of the aircraft to satisfy the process constraints and the terminal constraints. The angle of attack α is designed offline and is loaded to an airborne computer in advance, and the bank angle σ is usually generated online in real time according to an actual situation of a reentry mission.

At present, an existing technology is a trajectory design method based on "Quasi Equilibrium Gliding Condition (QEGC)". Specifically, because the flight path angle γ is always very small in a reentry gliding stage, this method assumes that the flight path angle γ is always zero in the reentry gliding stage, then a rate of change γ̇ is also zero, and the differential equation (5) is transformed into an algebraic equation:

$$L\cos\sigma - \left(g - \frac{V^2}{r}\right) = 0 \quad (20)$$

The equation (20) describes a relationship between the two control variables: the angle of attack α (which is implicit in the lift force L) and the bank angle σ, and the two state variables: the geocentric distance r and the flight velocity V, and is also referred to as a "quasi equilibrium gliding condition (QEGC)". Because the angle of attack α is designed offline in advance, the equation (20) shows a relationship between the bank angle σ and the geocentric distance r and the flight velocity V. Equations (11), (12), and (13) show relationships between the process constraints and the geocentric distance r and the flight velocity V. Therefore, a limit of the bank angle σ corresponding to the process constraints can be obtained through the above relationships. A control variable profile is planned within a limit of a control variable, to design a reference reentry trajectory.

The foregoing method ignores the "flight path angle and its rate of change". Therefore, a designed reentry trajectory may not satisfy a path constraint, thereby reducing the reliability of the reentry trajectory.

SUMMARY

In view of shortcomings of the existing technology, the present invention provides a new method for designing a reentry trajectory based on flight path angle planning. This method not only improves the accuracy of a reentry trajectory, but also has high reliability, and is conducive to the application in the reentry aerospace engineering.

To achieve the above objective, the technical solution of the present invention is as follows:

The method for designing a reentry trajectory based on flight path angle planning is provided, including the following steps:

S1. extracting an actual operating parameter of an aircraft, setting a maximum dynamic pressure $q_{max}$, a maximum stagnation point heat flux $\dot{Q}_{max}$, and a maximum overload $n_{max}$ according to a mission requirement, and solving for a velocity-height boundary for a reentry trajectory;

S2. solving for a reentry trajectory in an initial descent stage according to differential equations of reentry motion, and setting up a flight-path-angle lower limit $\gamma_{min}(V)$ according to the reentry trajectory in the initial descent stage, the velocity-height boundary, and a target point in a velocity-height phase plane; and S3. planning, based on the flight-path-angle lower limit $\gamma_{min}(V)$, a flight path angle satisfying terminal constraints, and calculating a corresponding bank angle to obtain a reentry trajectory.

The method for designing a reentry trajectory disclosed in the present invention can accurately plan a reentry trajectory, and avoid a risk that a reentry trajectory may not satisfy a path constraint because of assuming a flight path angle and its rate of change are zero. In addition, the method improves the reliability of a reentry trajectory, and has high calculation speed and high solving precision.

BRIEF DESCRIPTION OF DRAWINGS

To describe the technical solution in the embodiments of the present invention or in the prior art more clearly, the following briefly describes the accompanying drawings required for describing the embodiments or the prior art. The accompanying drawings in the following description show some embodiments of the present invention, and a person of ordinary skill in the art may still derive other drawings from these accompanying drawings without creative efforts.

DETAILED DESCRIPTION

To make the objective, the technical solutions, and advantages of the embodiments of the present invention clearer, the following clearly and completely describes the technical solutions in the embodiments of the present invention with reference to the accompanying drawings in the embodiments of the present invention.

Figure 1:
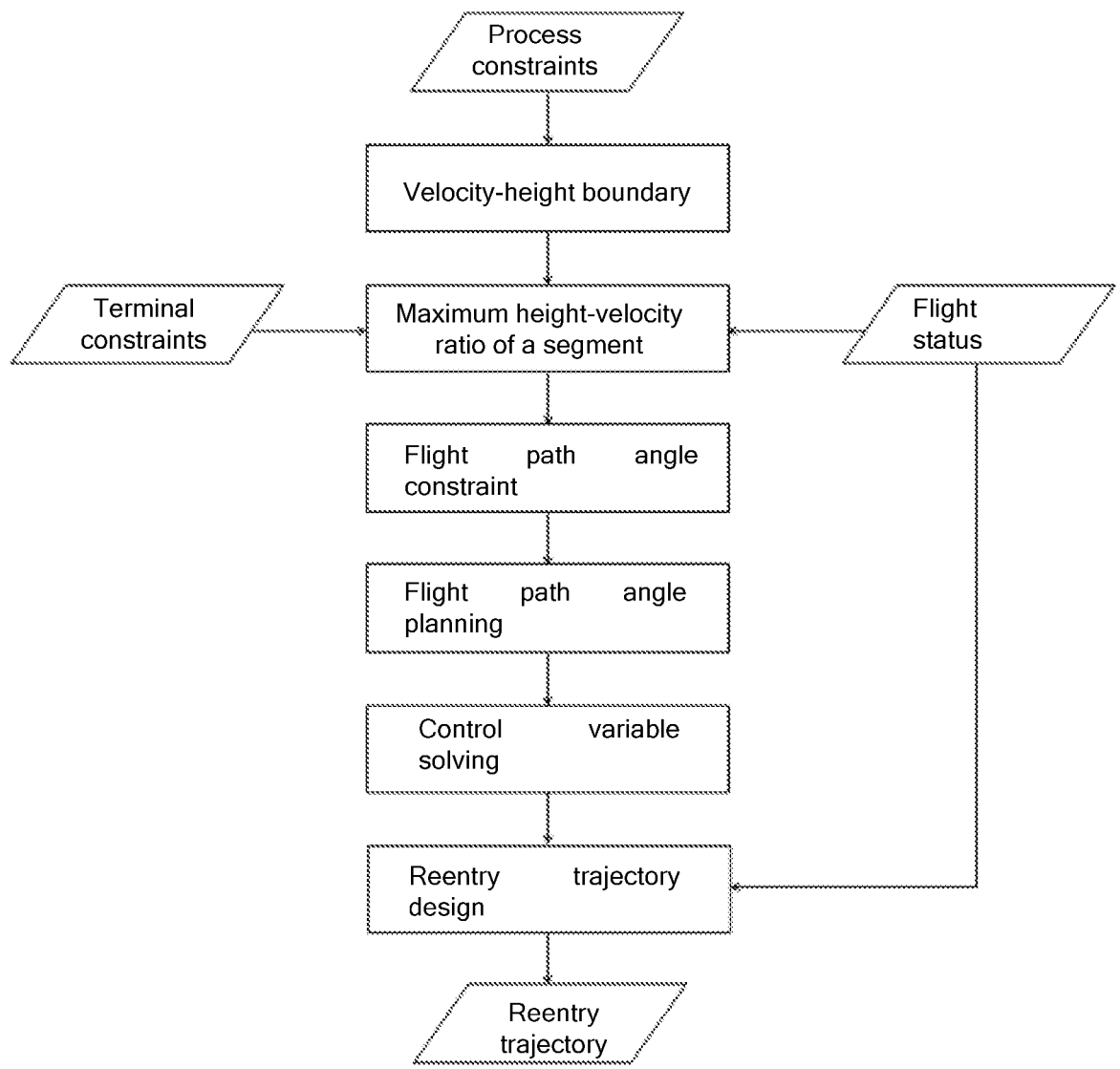
FIG. 1 is a calculation flowchart of a method according to the present invention.

As shown in FIG. 1, a method for designing a reentry trajectory based on flight path angle planning is provided, including the following steps:

S1. Extract an actual operating parameter of an aircraft, set a maximum dynamic pressure $q_{max}$, a maximum stagnation point heat flux $\dot{Q}_{max}$, and a maximum overload $n_{max}$ according to a mission requirement, and solve for a velocity-height boundary of a reentry trajectory, where S1 specifically includes the following steps:

Step S11. Extract the actual operating parameter of the aircraft, and set the maximum dynamic pressure $q_{max}$, the maximum stagnation point heat flux $\dot{Q}_{max}$, and the maximum overload $n_{max}$ according to the mission requirement of the aircraft.

Step S12. Calculate process constraints of a reentry trajectory according to the maximum dynamic pressure $q_{max}$, the maximum stagnation point heat flux $\dot{Q}_{max}$, and the maximum overload $n_{max}$, where specific description is as follows:

A flight velocity $V_Q$ and a geocentric distance $r_Q$ corresponding to the maximum stagnation point heat flux are calculated according to the following formula:

$$\dot{Q} = k_Q \rho^{0.5} V^{3.15} \leq \dot{Q}_{max}$$

where $k_Q$ represents the parameter of the aircraft, and ρ represents atmospheric density.

A flight velocity $V_q$ and a geocentric distance $r_q$ corresponding to the maximum dynamic pressure are calculated according to the following formula:

$$q = \tfrac{1}{2}\rho V^2 \leq q_{max}$$

A flight velocity $V_n$ and a geocentric distance $r_n$ corresponding to the maximum overload are calculated according to the following formula:

$$n = \frac{\sqrt{L^2 + D^2}}{mg} \leq n_{max}$$

where L represents lift force, and D represents drag force.

Through the foregoing calculation, the process constraints of the reentry trajectory that include a stagnation point heat flux constraint, a dynamic pressure constraint, and an overload constraint can be obtained.

Step S13. Draw the process constraints of the reentry trajectory in the velocity-height phase plane to obtain a velocity-height boundary of the reentry trajectory.

Figure 2:
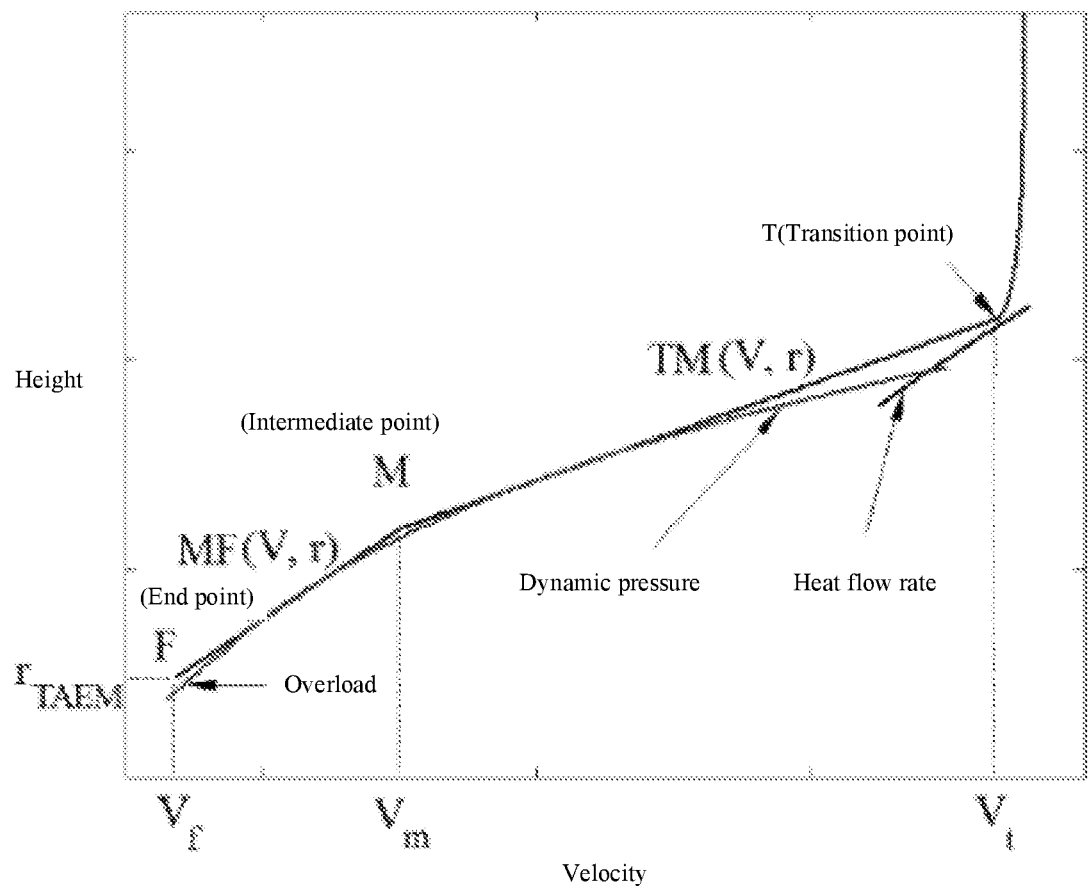
FIG. 2 is a schematic diagram of calculating a lower limit of a flight path angle according to the present invention.

S2. Solve for a reentry trajectory in an initial descent stage according to differential equations of reentry motion, and set up a flight-path-angle lower limit $\gamma_{min}(V)$ according to the reentry trajectory in the initial descent stage, the velocity-height boundary, and a target point in a velocity-height phase plane. As shown in FIG. 2, S2 specifically includes the following steps:

Step S21. According to the following differential equations of reentry motion, solve for a flight status variable in the initial descent stage, and draw the reentry trajectory in the initial descent stage in the velocity-height phase plane.

$$\frac{dr}{dt} = V \sin \gamma$$
$$\frac{d\theta}{dt} = \frac{V \cos \gamma \cos \psi}{r \cos \phi}$$
$$\frac{d\phi}{dt} = \frac{V \cos \gamma \sin \psi}{r}$$
$$\frac{dV}{dt} = -\frac{D}{m} - g \sin \gamma$$
$$\frac{d\gamma}{dt} = \frac{1}{V}\left[\frac{L}{m}\cos\sigma - \left(g - \frac{V^2}{r}\right)\cos \gamma\right]$$
$$\frac{d\psi}{dt} = \frac{1}{V}\left[\frac{L}{m \cos \gamma}\sin \sigma - \frac{V^2}{r}\cos \gamma \cos \psi \tan \phi\right]$$

where r represents a geocentric distance; $\theta$ represents a longitude; $\phi$ represents a latitude; V represents a velocity; $\gamma$ represents a flight path angle; $\psi$ represents a heading angle; m represents a mass of the aircraft; g represents a gravitational acceleration; L represents lift force; D represents drag force; and $\sigma$ represents bank angle. A series of points (V, r) in the velocity-height phase plane can be obtained through calculation according to the foregoing differential equations.

Step S22. Set up a flight-path-angle lower limit $\gamma_1(V)$ in a first stage of controllable flight of the aircraft according to the reentry trajectory in the initial descent stage and the velocity-height boundary in the velocity-height phase plane, where the step of calculating a flight-path-angle lower limit in a first stage includes:

Step A. Draw a common tangent $l_1$ of the reentry trajectory in the initial descent stage and the velocity-height boundary in the velocity-height phase plane. Specifically, tangent lines passing through points of the reentry trajectory in the initial descent stage are drawn. When the tangent line $l_1$ passing through a point of tangency T is also tangent to the velocity-height boundary, T is regarded as a transition point, that is, a dividing point between motion in the initial descent stage and the controllable flight motion of the aircraft, and corresponds to a point $(V_t, r_t)$ in the velocity-height phase plane.

Step B. Extract a slope $k_1$ of the common tangent $l_1$.

Step C. It can be learned according to the differential equations of reentry motion, a slope of a tangent line of the reentry trajectory satisfies the following formula:

$$k = \frac{dr}{dV} = V \sin \gamma / \left(-\frac{D}{m} - g \sin \gamma\right)$$

Therefore, the flight-path-angle lower limit $\gamma_1(V)$ in the first stage of the controllable flight of the aircraft is calculated according to a formula $$k = V \sin \gamma / \left(-\frac{D}{m} - g \sin \gamma\right),$$

that is:

$$\gamma_1(V) = -\arcsin \frac{Dk_1}{m(V + k_1 g)}$$

Step S23. Set up a flight-path-angle lower limit $\gamma_2(V)$ in a second stage of the controllable flight of the aircraft according to the target point and the velocity-height boundary in the velocity-height phase plane, where the step of calculating a flight-path-angle lower limit in a second stage includes:

Step D. Draw, in the velocity-height phase plane, a tangent line $l_2$ of the velocity-height boundary by passing through a reentry target point, that is, draw the straight line $l_2$ tangent to the velocity-height boundary by passing through an end point $F(V_f, r_f)$ corresponding to a terminal velocity and the geocentric distance, where an intersection point $M(V_m, r_m)$ between the straight line $l_1$ and the straight line $l_2$ is an intermediate point between the first stage and the second stage of the controllable flight of the aircraft.

Step E. Extract a slope $k_2$ of the tangent line $l_2$.

Step F. Calculate the flight-path-angle lower limit $\gamma_2(V)$ in the second stage of the controllable flight of the aircraft according to the formula $$k = V \sin \gamma / \left(-\frac{D}{m} - g \sin \gamma\right),$$

that is:

$$\gamma_2(V) = -\arcsin \frac{Dk_2}{m(V + k_2 g)}$$

Step S24. Combine the flight-path-angle lower limit in the first stage and the flight-path-angle lower limit in the second stage to obtain the flight-path-angle lower limit $\gamma_{min}(V)$ of the entire controllable flight process.

S3. Plan, based on the flight-path-angle lower limit $\gamma_{min}(V)$, a flight path angle satisfying terminal constraints, and calculate a corresponding bank angle to obtain a reentry trajectory, where S3 specifically includes the following steps:

Step S31. Specify two initial values $\Delta\gamma_1(V)$ and $\Delta\gamma_2(V)$ of a flight-path-angle increment $\Delta\gamma(V)$.

Step S32. Calculate flight path angles in different velocity conditions according to the following formula:

$$\gamma(V) = \gamma_{min}(V) + \Delta\gamma(V)$$

Step S33. Calculate corresponding bank angles according to a formula $$|\sigma(V)| = \arccos\left[\left(\frac{d\gamma V^2 \sin\gamma}{dr} + g\cos\gamma - \frac{V^2 \cos\gamma}{r}\right)\frac{m}{L}\right].$$

Step S34. Switch the bank angles between a positive and negative value by using a bank angle reversal logic, to satisfy a lateral trajectory control requirement.

Step S35. Calculate a range to go S from an end point to the target point during this round of design, determine whether the range to go S satisfies an error requirement; and if the range to go S does not satisfy the error requirement, update a flight-path-angle increment $\Delta\gamma_n$ according to the following formula:

$$\Delta\gamma_n = \Delta\gamma_{n-1} - \frac{(\Delta\gamma_{n-1} - \Delta\gamma_{n-2})(s_{n-1} - s_{TAEM})}{s_{n-1} - s_{n-2}}$$

Step S36. Repeatedly conduct step S32 to step S35 until an error satisfies the requirement.

In the present invention, the error requirement is specified according to a specific mission status. Usually, the terminal constraints include: the flight velocity V satisfies a terminal velocity requirement, and the geocentric distance, a range to go, and a heading error angle are within specific ranges:

$$V_f = V_{TAEM}$$

$$|r_f - r_{TAEM}| < \Delta r$$

$$|s_f - s_{TAEM}| < \Delta s$$

$$|\Delta\psi_f| < \Delta\psi_{TAEM}$$

In the formulas, a subscript f represents a reentry terminal status; and a subscript TAEM represents a required terminal status. s represents the range to go: by taking a plane determined by a point at which the aircraft is located, a target point, and the earth's center as an transient target plane, and the range to go refers to a length of a great circle arc projected to the earth's surface from a current position to the target point in the transient target plane. A longitude $\theta_f$ and latitude $\phi_f$ of the target point are known. The range to go is calculated according to the following formula:

$$s = \cos^{-1}[\sin\phi_f \sin\phi + \cos\phi_f \cos\phi \cos(\theta_f - \theta)]$$

A heading error angle is $\Delta\psi = \psi_{LOS} - \psi$ and represents an included angle between a line of sight (LOS) of the target point and current heading; $\psi_{LOS}$ represents a line-of-sight azimuth angle of the aircraft from a current position to the target point (due north is used as a reference, and clockwise is a positive direction); and an expression of $\psi_{LOS}$ is as follows:

$$\psi_{LOS} = \tan^{-1}\left[\frac{\sin(\theta_f - \theta)}{\cos\phi \tan\phi_f - \sin\phi \cos(\theta_f - \theta)}\right]$$

The present invention can accurately plan a reentry trajectory, avoid a risk that a reentry trajectory may not satisfy a path constraint because of assuming a flight path angle and its rate of change are zero in the prior art, and improve the reliability of a reentry trajectory.

The foregoing description is only preferred specific embodiment of the present invention, and the protection scope of the present invention is not limited thereto. Any equivalent replacement or modification made according to the technical solution and inventive concept by a person skilled in the art within a technical scope of the present invention shall fall within the protection scope of the present invention.

What is claimed is:

1. A method for designing a reentry trajectory based on flight path angle planning, comprising the following steps:
    S1. extracting an actual operating parameter of an aircraft, setting a maximum dynamic pressure $q_{max}$, a maximum stagnation point heat flux $\dot{Q}_{max}$, and a maximum overload $n_{max}$ according to a mission requirement, and solving for a velocity-height boundary of a reentry trajectory;
    S2. solving for a reentry trajectory in an initial descent stage according to differential equations of reentry motion, and setting up a flight-path-angle lower limit $\gamma_{min}(V)$ according to the reentry trajectory in the initial descent stage, the velocity-height boundary, and a target point in a velocity-height phase plane; and
    S3. planning, based on the flight-path-angle lower limit $\gamma_{min}(V)$, a flight path angle satisfying terminal constraints, and calculating a corresponding bank angle to obtain a reentry trajectory.

2. The method for designing a reentry trajectory according to claim 1, wherein step S1 comprises:
    step S11. extracting the actual operating parameter of the aircraft, and setting the maximum dynamic pressure $q_{max}$, the maximum stagnation point heat flux $\dot{Q}_{max}$, and the maximum overload $n_{max}$ according to the mission requirement of the aircraft;
    step S12. calculating process constraints of a reentry trajectory according to the maximum dynamic pressure $q_{max}$, the maximum stagnation point heat flux $\dot{Q}_{max}$, and the maximum overload $n_{max}$; and
    step S13. drawing the process constraints of the reentry trajectory in the velocity-height phase plane to obtain a velocity-height boundary of the reentry trajectory.

3. The method for designing a reentry trajectory according to claim 1, wherein step S2 comprises:
    step S21. according to the following differential equations of reentry motion, solving for a flight status variable in the initial descent stage, and drawing the reentry trajectory in the initial descent stage in the velocity-height phase plane:

$$\frac{dr}{dt} = V \sin\gamma$$

$$\frac{d\theta}{dt} = \frac{V \cos\gamma \cos\psi}{r \cos\phi}$$

$$\frac{d\phi}{dt} = \frac{V \cos\gamma \sin\psi}{r}$$

-continued $$\frac{dV}{dt} = -\frac{D}{m} - g \sin \gamma$$

$$\frac{d\gamma}{dt} = \frac{1}{V}\left[\frac{L}{m}\cos\sigma - \left(g - \frac{V^2}{r}\right)\cos\gamma\right]$$

$$\frac{d\psi}{dt} = \frac{1}{V}\left[\frac{L}{m\cos\gamma}\sin\sigma - \frac{V^2}{r}\cos\gamma\cos\psi\tan\phi\right]$$

wherein r represents a geocentric distance; $\theta$ represents a longitude; $\phi$ represents a latitude; V represents a velocity; $\gamma$ represents a flight path angle; $\psi$ represents a heading angle; m represents a mass of the aircraft; g represents a gravitational acceleration; L represents lift force; D represents drag force; and $\sigma$ represents a bank angle;

step S22. setting up a flight-path-angle lower limit $\gamma_1(V)$ in a first stage of controllable flight of the aircraft according to the reentry trajectory in the initial descent stage and the velocity-height boundary in the velocity-height phase plane;

step S23. setting up a flight-path-angle lower limit $\gamma_2(V)$ in a second stage of the controllable flight of the aircraft according to the target point and the velocity-height boundary in the velocity-height phase plane; and step S24. combining the flight-path-angle lower limit in the first stage and the flight-path-angle lower limit in the second stage to obtain the flight-path-angle lower limit $\gamma_{min}(V)$ of the entire controllable flight process.

4. The method for designing a reentry trajectory according to claim 3, wherein the step of setting up a flight-path-angle lower limit in a first stage comprises:

step 221. drawing a common tangent $l_1$ of the reentry trajectory in the initial descent stage and the velocity-height boundary in the velocity-height phase plane;

step 222. extracting a slope $k_1$ of the common tangent $l_1$; and step 223. calculating the flight-path-angle lower limit $\gamma_1(V)$ in the first stage of the controllable flight of the aircraft according to a formula $$k = V \sin \gamma / \left(-\frac{D}{m} - g \sin \gamma\right).$$

5. The method for designing a reentry trajectory according to claim 3, wherein the step of calculating a flight-path-angle lower limit in a second stage comprises:

step 231. drawing, in the velocity-height phase plane, a tangent line $l_2$ of the velocity-height boundary by passing through a reentry target point;

step 232. extracting a slope $k_2$ of the tangent line $l_2$; and step 233. calculating the flight-path-angle lower limit $\gamma_2(V)$ in the second stage of the controllable flight of the aircraft according to the formula $$k = V \sin \gamma / \left(-\frac{D}{m} - g \sin \gamma\right).$$

6. The method for designing a reentry trajectory according to claim 1, wherein step S3 comprises:

step S31. specifying two initial values $\Delta\gamma_1(V)$ and $\Delta\gamma_2(V)$ of a flight-path-angle increment $\Delta\gamma(V)$;

step S32. calculating flight path angles in different velocity conditions according to the following formula:

$$\gamma(V)=\gamma_{min}(V)+\Delta\gamma(V)$$

step S33. calculating corresponding bank angles according to a formula $$|\sigma(V)| = \arccos\left[\left(\frac{d\gamma V^2 \sin\gamma}{dr} + g\cos\gamma - \frac{V^2\cos\gamma}{r}\right)\frac{m}{L}\right];$$

step S34. switching the bank angles between a positive and negative value by using a bank angle reversal logic, to satisfy a lateral trajectory control requirement;

step S35. calculating a range to go s from an end point to the target point during this round of design, determining whether the range to go s satisfies an error requirement; and if the range to go s does not satisfy the error requirement, updating a flight-path-angle increment $\Delta\gamma_n$ according to the following formula:

$$\Delta\gamma_n = \Delta\gamma_{n-1} - \frac{(\Delta\gamma_{n-1} - \Delta\gamma_{n-2})(s_{n-1} - s_{TAEM})}{s_{n-1} - s_{n-2}};$$

and step S36. repeatedly conducting step S32 to step S35 until an error satisfies the requirement.

7. The method for designing a reentry trajectory according to claim 6, wherein the range to go s is obtained through the following formula:

$$s=\cos^{-1}[\sin\phi_f \sin\phi + \cos\phi_f \cos\phi \cos(\theta_f-\theta)]$$

wherein $\phi_f$ represents a latitude of the target point, and $\theta_f$ represents a longitude of the target point.

* * * * *